United States Patent
Gidman et al.

(10) Patent No.: US 10,839,166 B1
(45) Date of Patent: *Nov. 17, 2020

(54) METHODS AND SYSTEMS FOR INTER-APPLICATION COMMUNICATION

(71) Applicant: Loomis Sayles & Company, L.P., Boston, MA (US)

(72) Inventors: John Gidman, Hull, MA (US); Christian Dietz, Scituate, MA (US)

(73) Assignee: Loomis Sayles & Company, L.P., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,693

(22) Filed: Jan. 9, 2020

Related U.S. Application Data

(60) Provisional application No. 62/870,381, filed on Jul. 3, 2019.

(51) Int. Cl.
| | |
|---|---|
| *G06F 3/048* | (2013.01) |
| *G06F 40/30* | (2020.01) |
| *G06F 9/54* | (2006.01) |
| *G06F 3/0484* | (2013.01) |
| *H04L 12/58* | (2006.01) |
| *G06F 40/117* | (2020.01) |
| *G06F 16/33* | (2019.01) |

(52) U.S. Cl.
CPC .......... *G06F 40/30* (2020.01); *G06F 3/04842* (2013.01); *G06F 9/546* (2013.01); *G06F 16/334* (2019.01); *G06F 40/117* (2020.01); *H04L 51/04* (2013.01)

(58) Field of Classification Search
CPC combination set(s) only.
See application file for complete search history.

(56) References Cited

U.S. PATENT DOCUMENTS

| | | |
|---|---|---|
| 7,231,596 B2 | 6/2007 | Koren |
| 8,458,596 B1 | 6/2013 | Malks et al. |

(Continued)

FOREIGN PATENT DOCUMENTS

EP   2521043 A1   11/2012

OTHER PUBLICATIONS

International Search Report and Written Opinion for PCT/2014/015090, dated Apr. 29, 2014.

*Primary Examiner* — Xiomara L Bautista
(74) *Attorney, Agent, or Firm* — Foley Hoag LLP; Rajesh Vallabh

(57) ABSTRACT

A data processing method includes (a) executing a messaging application program and other application programs on a computer system; (b) analyzing text in each message handled by the messaging application program to identify textual data items in the message that can potentially be processed by the application programs; (c) displaying the analyzed messages to the user, such that each textual data item in the messages is visually marked and selectable by the user; (d) receiving an input from the user selecting a textual data item; (e) broadcasting information on the selected textual data item to the application programs; (f) determining independently through each of the application programs whether the broadcasted information is semantically relevant to that application program; and (g) if so, processing the information through the application program and displaying results to the user.

20 Claims, 6 Drawing Sheets

(56) References Cited

U.S. PATENT DOCUMENTS

| | | |
|---|---|---|
| 9,135,095 B2 * | 9/2015 | Gidman .................. G06F 9/546 |
| 2005/0050021 A1 | 3/2005 | Timmons |
| 2007/0130541 A1 | 6/2007 | Louch et al. |
| 2008/0077936 A1 | 3/2008 | Goel et al. |
| 2009/0077027 A1 * | 3/2009 | King ..................... G06F 40/157 |
| 2011/0029626 A1 | 2/2011 | Goodrow et al. |
| 2011/0088046 A1 | 4/2011 | Guertler et al. |
| 2011/0238555 A1 | 9/2011 | Rosenthal |
| 2012/0095956 A1 | 4/2012 | Xiong et al. |
| 2012/0209839 A1 | 8/2012 | Andrews et al. |
| 2017/0161372 A1 * | 6/2017 | Fern ndez ............. G06F 40/268 |

\* cited by examiner

METHODS AND SYSTEMS FOR INTER-APPLICATION COMMUNICATION

CROSS REFERENCE TO RELATED APPLICATION

This application claims priority from U.S. Provisional Patent Application No. 62/870,381 filed on Jul. 3, 2019 entitled METHODS AND SYSTEMS FOR INTER-APPLICATION COMMUNICATION, which is hereby incorporated by reference.

BACKGROUND

The present application relates generally to methods and systems for facilitating communication among application programs running in a computer system.

BRIEF SUMMARY OF THE DISCLOSURE

A computer system in accordance with one or more embodiments comprises at least one processor; memory associated with the at least one processor; a display; and a messaging application program and one or more other application programs stored in the memory that can be executed by the at least one processor. Each of the messaging application program and the one or more other application programs are capable of processing data and displaying data to a user of the computer system on the display. The messaging application program enables real-time transmission of messages to and from the user. The computer system is configured to: (a) execute the messaging application program and the one or more other application programs on a computer system; (b) analyze text in each message received by or to be sent by the user in the messaging application program to identify one or more textual data items in the message that can potentially be processed by the one or more other application programs; (c) display messages analyzed in (b) to the user by the messaging application, wherein each textual data item in the messages identified in step (b) is visually marked and selectable by the user; (d) receive an input from the user selecting a textual data item in one of the messages; (e) broadcast information on the textual data item selected by the user to the one or more other application programs; (f) determine independently through each of the one or more other application programs whether the information on the textual data item broadcast in step (e) is semantically relevant to that application program; and (g) when the information on the textual data item is determined to be semantically relevant to an application program, process the information on the textual data item through the application program and display results to the user.

A data processing method in accordance with one or more embodiments includes the steps of: (a) executing a messaging application program and one or more other application programs on a computer system, each of the messaging application program and the one or more other application programs displaying data to a user of the computer system, wherein the messaging application program enables real-time transmission of messages to and from the user; (b) analyzing text in each message received by or to be sent by the user in the messaging application program to identify one or more textual data items in the message that can potentially be processed by the one or more other application programs; (c) displaying messages analyzed in (b) to the user by the messaging application, wherein each textual data item in the messages identified in step (b) is visually marked and selectable by the user; (d) receiving an input from the user selecting a textual data item in one of the messages; (e) broadcasting information on the textual data item selected by the user to the one or more other application programs; (f) determining independently through each of the one or more other application programs whether the information on the textual data item broadcast in step (e) is semantically relevant to that application program; and (g) when the information on the textual data item is determined to be semantically relevant to an application program, processing the information on the textual data item through the application program and displaying results to the user.

DETAILED DESCRIPTION

U.S. Pat. No. 9,135,095 entitled METHODS AND SYSTEMS FOR INTER-APPLICATION COMMUNICATION is assigned to the assignee of the present application and is incorporated by reference herein. That patent discloses methods and systems for enabling application programs executing on a computer system to share data with each other. A computer system user can post a particular data item displayed by one application program on a virtual bulletin board. Other application programs running on the computer system listen for posted data items. If an application program determines that a posted data item is relevant to that application program, it automatically imports and processes the data item along with any needed other data associated with the data item, and displays the results to the user.

The inter-application communication system enables application developers to create complex software systems from a large number of relatively small and simple individual application programs. Users can select any particular combination of application programs to work together from many different possible combinations. Working with relatively small and simple individual application programs rather than larger and significantly more complex programs allows system developers to greatly increase the speed of software development. Also, support and maintenance costs can be reduced.

Figure 1:
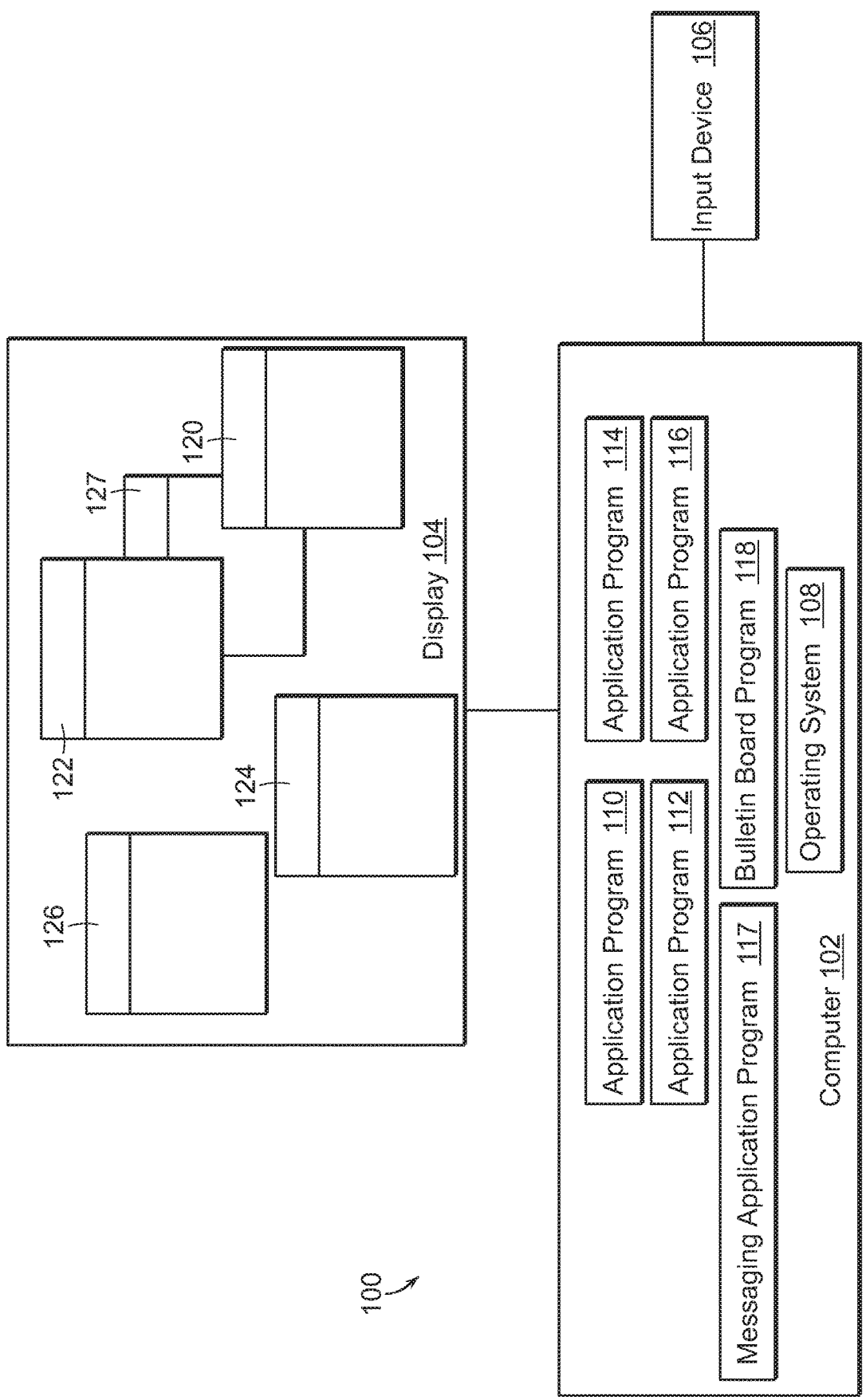
FIG. 1 is a schematic illustration of an exemplary inter-application communication system in accordance with one or more embodiments.

FIG. 1 is a simplified illustration of an exemplary inter-application communication system 100 in accordance with one or more embodiments. The system 100 includes a computer system 102 operatively coupled to a display 104 and one or more user input devices 106, e.g., a keyboard or mouse. (Other configurations are also possible. For instance, the input device can be incorporated in a touch screen display.) The computer system 102 includes an operating system 108, on which a plurality of application programs 110, 112, 114, 116, a Messaging application program 117, and a Bulletin Board application program 118 can be executed. In this example, the user has selected this combination of four applications 110, 112, 114, 116 to run from a larger set of available applications (not shown). The application programs 110, 112, 114, 116, generate windows or panes 120, 122, 124, 126, respectively, on the computer display 104. The Messaging application 117 enables real-time exchange of messages containing text among users or groups through window 127.

The computer system 102 comprises any type of computing device or system capable of running application programs. The computer system 102 comprises a user-operated device such as a personal computer (e.g., a desktop, notebook, or tablet computer), a workstation, a smart phone, or a personal digital assistant. The computer system 102 can also comprise one or more remote computers connected to a user-operated device over a communications network (e.g., the Internet, a local area network, a wide area network, a wireless network, a cellular network, or some combination thereof). The application programs can execute entirely on the user-operated device, partly on the user-operated device and partly on the one or more remote computers, or entirely on the one or more remote computers.

Figure 2:
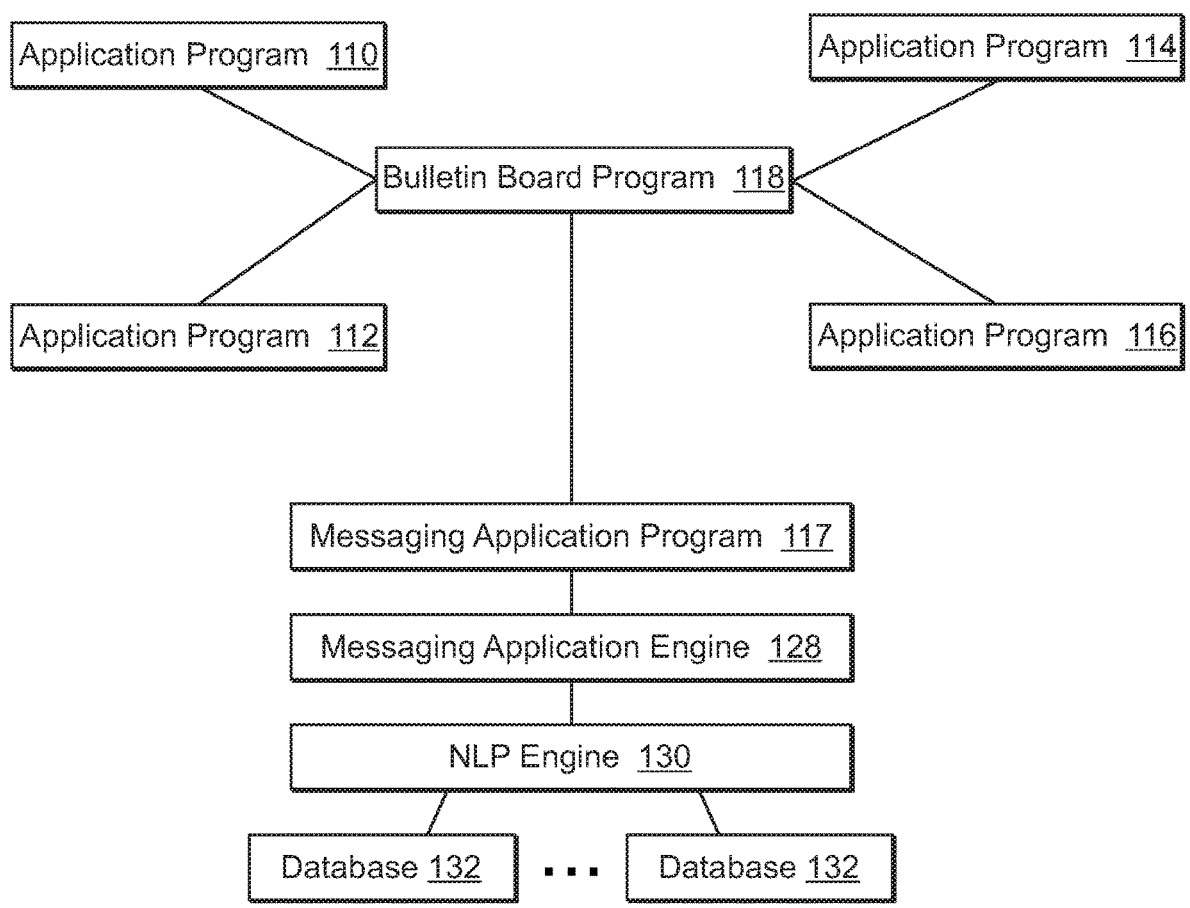
FIG. 2 is a schematic illustration of an exemplary computer software system used in the inter-application communication system of FIG. 1.

FIG. 2 is a simplified block diagram illustrating an example of a software architecture in accordance with one or more embodiments. Each of the application programs 110, 112, 114, 116 can communicate with the Bulletin Board application program 118. When a user posts a textual data item on the Bulletin Board from the Messaging application 117 (as will be discussed below), the Bulletin Board application 118 broadcasts the data item to all the other applications running on the computer system 102. The other applications listen for posted data items. If they determine that the posted data item is relevant, they automatically import and process the data item (and any needed related data associated with the data item), and display the results to the user.

A Messaging application engine 128 is associated with the Messaging application 117. A natural language processing (NLP) engine 130 analyzes messages handled by the Messaging application 117 using information in databases 132, as will be discussed below.

The inter-application communication system enables the Messaging application 117 to send selected tagged data in messages to one or more other applications 110, 112, 114, 116 on the computer system 102 via the Bulletin Board application program 118 so that the other applications can analyze the data and, if relevant, process the data and display results to the user. The system thereby allows a recipient or sender of a message in the Messaging application 117 to quickly and easily select information in the message for processing by the other applications.

Figure 3:
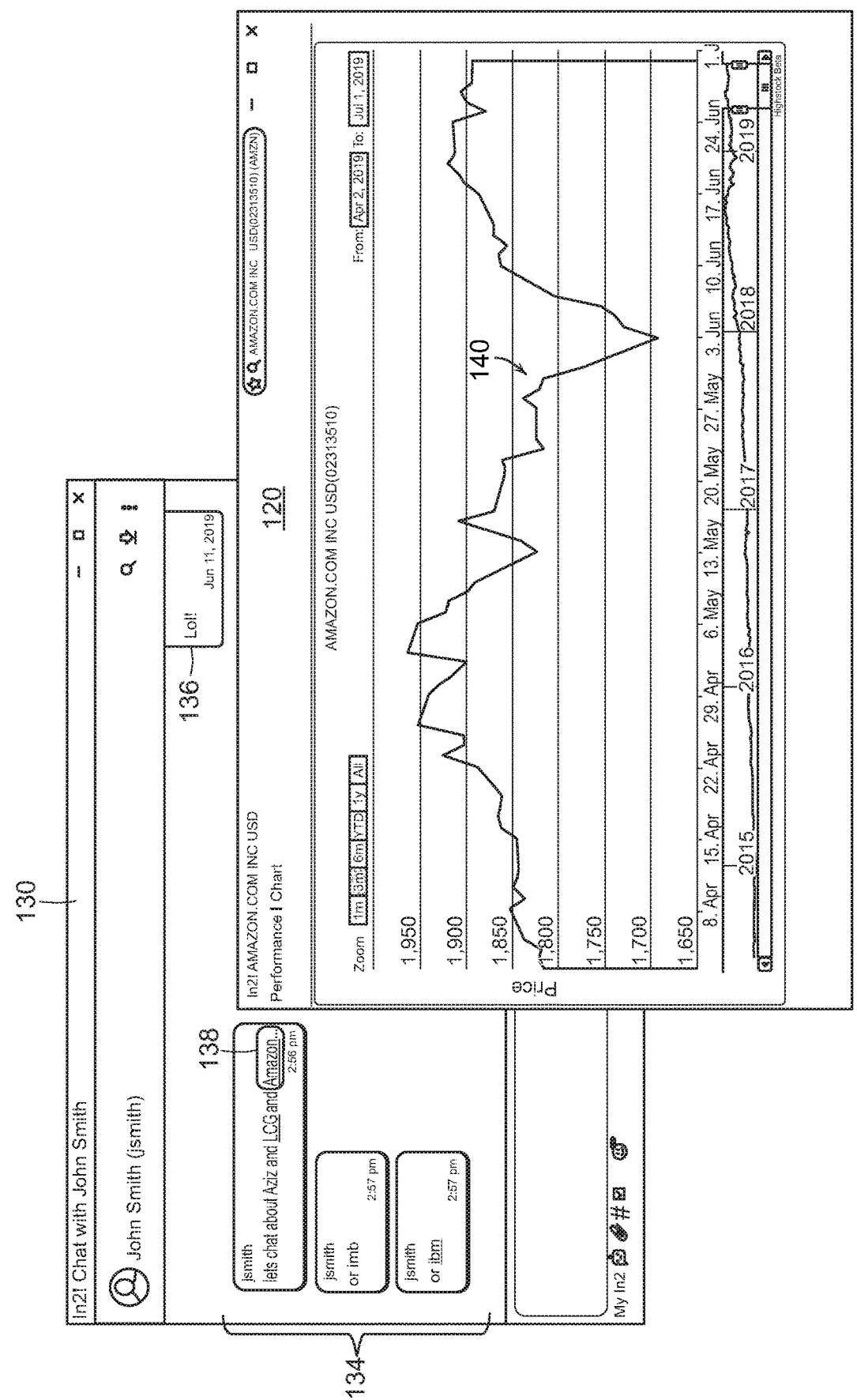
FIGS. 3-5 are screenshots illustrating an exemplary inter-application communication process in accordance with one or more embodiments.

The following is a simple example illustrating an inter-application communication process for processing and displaying financial data in accordance with one or more embodiments. FIG. 3 is an exemplary screenshot from the display 104 of the computer system 102 operated by a user (jsmith) for processing and displaying financial data. In this example, the user is running two applications: a Messaging application 117 (depicted in window 127) and an application 110 comprising a Price Chart Application (depicted in window 120). The Messaging application 117 displays a sequence of messages 134 containing text content sent by the user to another person (or group) and messages 136 received by the user from the other person (or group) in a chat conversation. The computer system analyzes the messages and identifies particular textual data items (shown underlined) contained in the messages that can potentially be processed by other application programs. These textual data items are tagged so that they can be clicked on (or otherwise selected) by the user in order to automatically post the textual data items (or associated information) to the Bulletin Board application 118. The Bulletin Board application 118 receives the user-selected data item and broadcasts it to all the other applications running on the computer system 102. The other applications listen for posted data items. If they determine that the posted data item is relevant, they automatically import and process the data item (and any needed related data associated with the data item), and display the results to the user.

In the FIG. 3 example, the the user selects the textual data item 138 ("Amazon") in a message displayed by the Messaging application. The system then automatically sends the selected textual data item 138 to the Bulletin Board application 118. In this example, the Price Chart Application 110 listens for data items broadcast by the Bulletin Board application 118, determines whether the data posted is relevant to the Price Chart Application 110. Relevance is determined based on whether the data is semantically relevant. For example, the Price Chart Application 110 is configured to only act on semantic data having a specified description (e.g., an account or security). In this case, the Price Chart program 110 determines that "Amazon" refers to a security. After determining this data is relevant, the Price Chart application 110 processes the data, e.g., by generating a chart 140 from the data, which is then displayed to the user in window 120.

Figure 4:
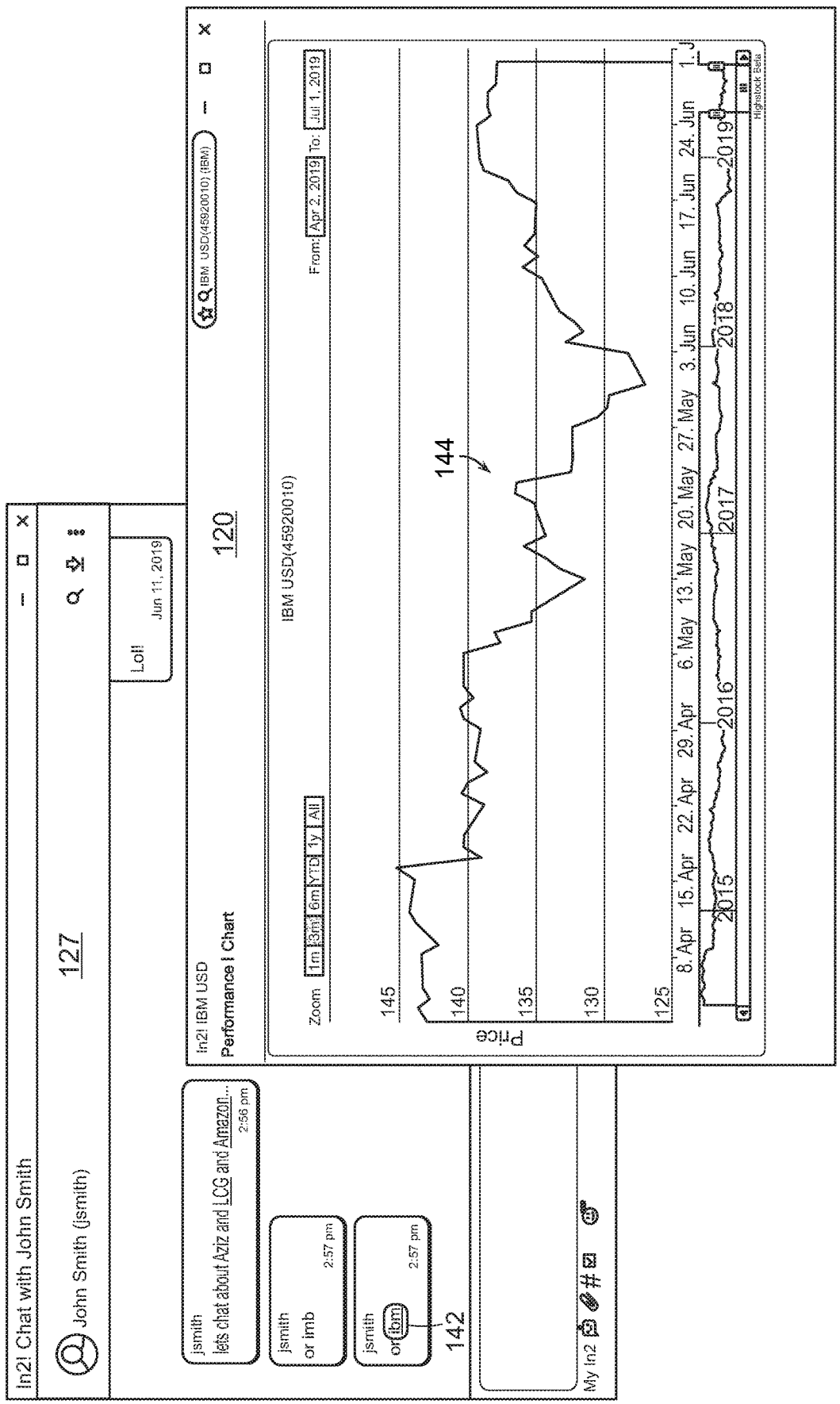

In further example, as shown in FIG. 4, if the user then selects another tagged textual data item 142 ("IBM") in the Messaging application 117, the Price Chart Application 110 generates a price chart for IBM and displays the chart 144 to the user in window 120.

Figure 5:
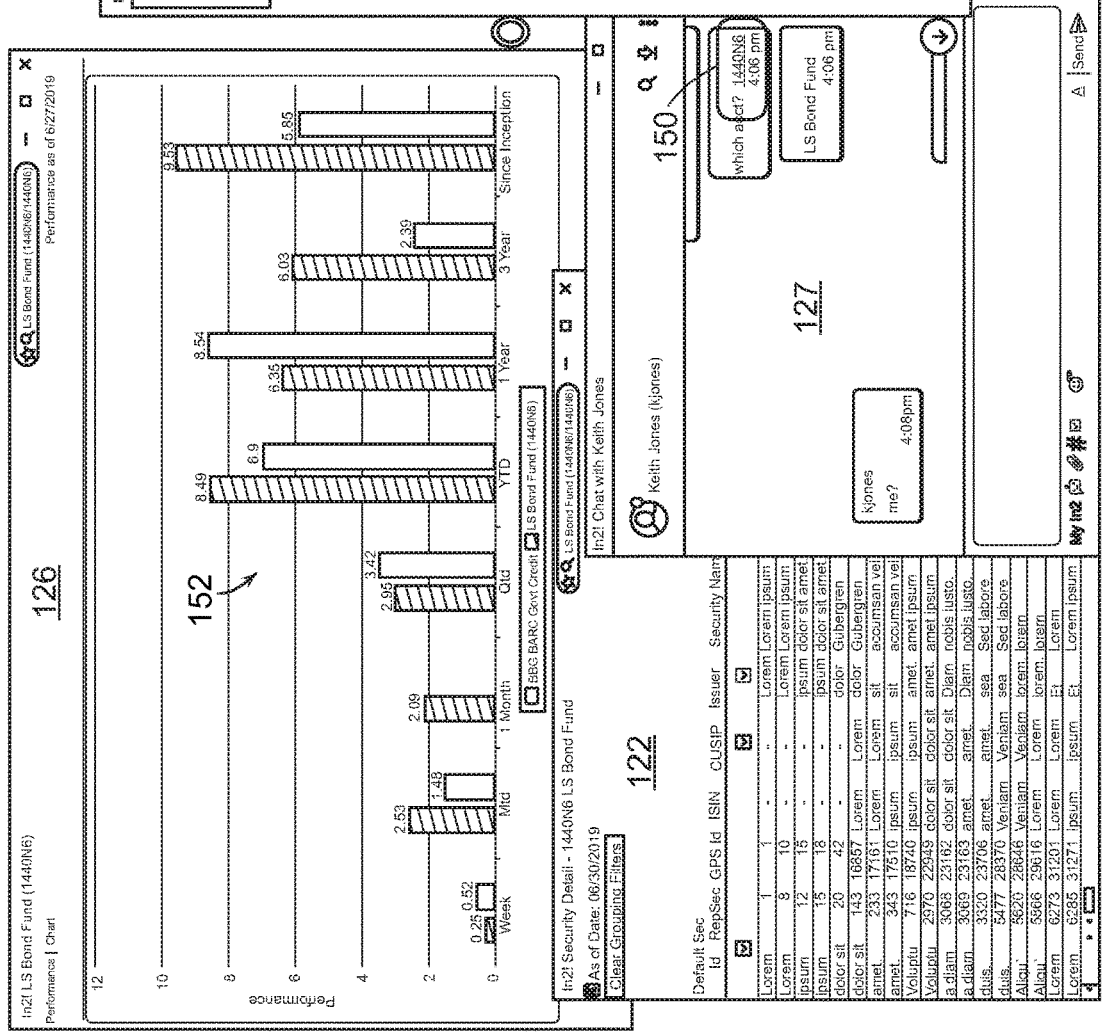

FIG. 5 is a screenshot illustrating another exemplary use of the inter-application communication system. In this example, a user (kjones) is running four application programs on a computer system: a Messaging application 117 (depicted in window 127), a Security Detail application 112 (depicted in window 122), a Search application 114 (depicted in window 124), and a Performance Chart application 116 (depicted in window 126). The Messaging application 117 lists various text messages sent or received by the user or an organization. The Security Detail application 112 can display detailed information on particular financial securities held by a given client account. The Search application 114 can conduct a database search for additional information. The Performance Chart application 116 can generate and display a performance chart from client account data. The user selects a tagged textual data item 150 from the data displayed in the window of the Messaging application 117. In this example, the user has selected a particular client account (1440N6), resulting in the system posting the information on the client account in Bulletin Board 118. The Security Detail application 112, the Search application 114, and the Performance Chart application 116 each analyze the posted information, determine that it is relevant, and accordingly import the data item 150 (and any needed related data) and process and display the results. Specifically, the Search application 116 retrieves additional account information related to the particular client account 150 posted in the Bulletin Board and displays that information to the user. The Securities Detail application 112 retrieves information on each of the securities held in the posted client account and displays that information. In addition, the Performance Chart application 116 generates a chart 152 indicating performance of the posted client account and displays the results to the user.

The computer system 102 analyzes the messages handled by the Messaging application 117 to identify the textual data items for tagging based on whether the textual data items could potentially be processed by an application program available to the user. In one or more embodiments, the computer system 102 uses natural language processing (NLP) and artificial intelligence to determine the probable meaning of text in the messages and whether any text items in the messages should be tagged. In one or more embodiments, the NLP engine 130 receives the messages and determines whether the messages contain any text describing known defined entities and concepts in a universe of entities and concepts stored in the databases 132. Non-limiting examples of such defined entities and concepts for financial applications include Issuers, Securities, Investment Managers, Consultants, Employees, Products, and sales activities.

Once the NLP engine 130 has analyzed the text, it returns to the Messaging application 117 any entities or concepts found with metadata, and identifies the text that should be tagged or visually marked (shown underlined in the figures) to indicate that it is actionable. For example, "IBM" has a series of name or type: value pairs (e.g., "Security":"IBM") for its identifiers in one or more databases. The NLP engine 130 instructs the Messaging application 117 to replace the word "IBM" in the message with "IBM". The Messaging engine 128 thereby visually identifies IBM as a clickable hotspot in window 127. The Messaging application 117 transmits all associated name value pairs to the Bulletin Board upon selection of IBM by the user, similar to a hyperlink in a browser. The Bulletin Board application then broadcasts the data to all the other applications running on the computer system 102. The other applications listen for posted data items. If they determine that the posted data item is relevant, they automatically import and process the data item (and any needed related data associated with the data item), and display the results to the user.

Figure 6:
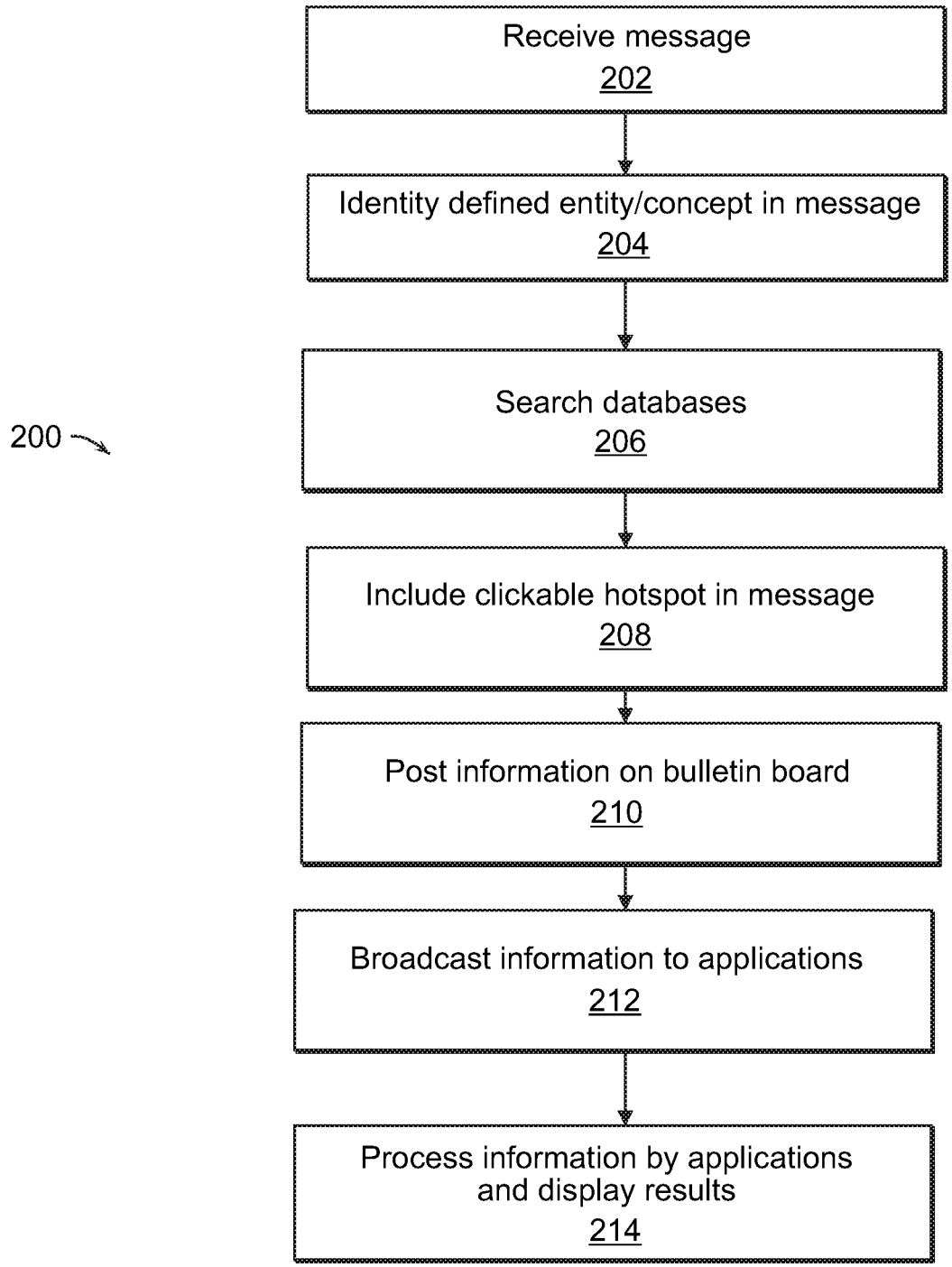
FIG. 6 is a flow chart illustrating an exemplary inter-application communication process in accordance with one or more embodiments.

FIG. 6 is a flowchart 200 illustrating an exemplary inter-application communication process in accordance with one or more embodiments.

At step 202, the Messaging application receives a text message mentioning "IBM" from a sender.

At step 204, the NLP engine associated with Messaging application receives and analyzes the message to determine the probable meaning of text. The NLP engine identifies "IBM" as a possible entity.

At step 206, the NLP engine determines if "IBM" is present in one or more databases of defined entities and concepts. It finds "IBM" in a database, which specifies a type: value pair (Security: IBM) associated with IBM.

At step 208, the NLP engine sends the (Security: IBM) information found in the database to Messaging application. The Messaging application engine 130 then replaces the word "IBM" in the message with "IBM" as a clickable hotspot.

At step 210, when the user of the Messaging application clicks on IBM, the Messaging application sends (Security: IBM) information to the Bulletin Board application.

At step 212, the Bulletin Board application broadcasts the (Security: IBM) information to other applications running on the computer system.

At step 214, other application programs running on the computer system listen for posted data items. If an application program determines that Security: IBM is relevant to that application program, it automatically processes the data item along with any needed other data associated with the data item, and displays the results to the user.

In this way, the inter-application communication system enables recipients or senders of messages in Messaging applications to quickly and easily have information in the messages processed by various applications, so that they can quickly and easily access desired information.

The processes of the inter-application communication system 100 described above may be implemented in software, hardware, firmware, or any combination thereof. The processes are preferably implemented in one or more computer programs executing on a programmable computer including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

The invention claimed is:

1. A data processing method, comprising the steps of:
   (a) executing a messaging application program and one or more other application programs on a computer system, each of the messaging application program and the one or more other application programs displaying data to a user of the computer system, wherein the messaging application program enables real-time transmission of messages to and from the user;
   (b) analyzing text in each message received by or to be sent by the user in the messaging application program to identify one or more textual data items in the message that can potentially be processed by the one or more other application programs;
   (c) displaying messages analyzed in (b) to the user by the messaging application, wherein each textual data item in the messages identified in step (b) is visually marked and selectable by the user;
   (d) receiving an input from the user selecting a textual data item in one of the messages;

(e) broadcasting information on the textual data item selected by the user to the one or more other application programs;

(f) determining independently through each of the one or more other application programs whether the information on the textual data item broadcast in step (e) is semantically relevant to that application program; and (g) when the information on the textual data item is determined to be semantically relevant to an application program, processing the information on the textual data item through the application program and displaying results to the user.

2. The method of claim 1, wherein analyzing text in each message received by or to be sent by the user in step (b) is performed using natural language processing.

3. The method of claim 2, wherein the one or more textual data items are identified in step (b) by searching for the one or more textual data items in one or more databases of known entities or concepts.

4. The method of claim 3, wherein the information on each textual data item comprises a type:value pair associated with the textual data item in the one or more databases.

5. The method of claim 3, wherein the data comprises financial data, and wherein the entities or concepts comprise Issuers, Securities, Investment Managers, Consultants, Employees, Products, or sales activities.

6. The method of claim 5, wherein the one or more other application programs include at least one of a Price Chart application, a Security Detail application, a Search application, and a Performance Chart application.

7. The method of claim 1, wherein the one or more textual data items are visually marked by being underlined or shown in a different color or font relative to other text in the messages.

8. The method of claim 1, wherein the textual data item selectable by the user comprises a clickable hotspot.

9. The method of claim 1, wherein the computer system comprises a user-operated device and one or more remote computers connected to the user-operated device over a communications network, and wherein the application programs execute entirely on the user-operated device, partly on the user-operated device and partly on the one or more remote computers, or entirely on the one or more remote computers.

10. A computer system, comprising:
 at least one processor;
 memory associated with the at least one processor;
 a display; and
 a messaging application program and one or more other application programs stored in the memory that can be executed by the at least one processor, each of the messaging application program and the one or more other application programs capable of processing data and displaying data to a user of the computer system on the display, wherein the messaging application program enables real-time transmission of messages to and from the user, wherein the computer system is configured to:
 (a) execute the messaging application program and the one or more other application programs on a computer system;
 (b) analyze text in each message received by or to be sent by the user in the messaging application program to identify one or more textual data items in the message that can potentially be processed by the one or more other application programs;

(c) display messages analyzed in (b) to the user by the messaging application, wherein each textual data item in the messages identified in step (b) is visually marked and selectable by the user;

(d) receive an input from the user selecting a textual data item in one of the messages;

(e) broadcast information on the textual data item selected by the user to the one or more other application programs;

(f) determine independently through each of the one or more other application programs whether the information on the textual data item broadcast in step (e) is semantically relevant to that application program; and (g) when the information on the textual data item is determined to be semantically relevant to an application program, process the information on the textual data item through the application program and display results to the user.

11. The system of claim 10, wherein the text in each message received by or to be sent by the user is analyzed in (b) using natural language processing.

12. The system of claim 11, wherein the one or more textual data items are identified in (b) by searching for the one or more textual data items in one or more databases of known entities or concepts.

13. The system of claim 12, wherein the information on each textual data item comprises a type:value pair associated with the textual data item in the one or more databases.

14. The system of claim 12, wherein the data comprises financial data, and wherein the entities or concepts comprise Issuers, Securities, Investment Managers, Consultants, Employees, Products, or sales activities.

15. The system of claim 14, wherein the one or more other application programs include at least one of a Price Chart application, a Security Detail application, a Search application, and a Performance Chart application.

16. The system of claim 10, wherein the one or more textual data items are visually marked by being underlined or shown in a different color or font relative to other text in the messages.

17. The system of claim 10, wherein the textual data item selectable by the user comprises a clickable hotspot.

18. The system of claim 10, wherein the computer system comprises a user-operated device and one or more remote computers connected to the user-operated device over a communications network, and wherein the application programs execute entirely on the user-operated device, partly on the user-operated device and partly on the one or more remote computers, or entirely on the one or more remote computers.

19. A inter-application communication method, comprising the steps of:
 (a) executing a messaging application program and one or more other application programs on a computer system, each of the messaging application program and the one or more other application programs displaying data to a user of the computer system, wherein the messaging application program enables real-time transmission of messages to and from the user;
 (b) analyzing text in each message received by or to be sent by the user in the messaging application program using natural language processing to identify one or more textual data items in the message that can potentially be processed by the one or more other application programs, and by searching for the one or more textual data items in one or more databases of known entities or concepts;

(c) tagging the one or more textual data items identified in step (b) by visually marking the one or more textual data items and making the one or more textual data items user-selectable in the messages displayed to the user;
(d) receiving an input from the user selecting a textual data item in one of the messages;
(e) broadcasting information on the textual data item selected by the user to the one or more other application programs;
(f) determining independently through each of the one or more other application programs whether the information on the textual data item broadcast in step (e) is semantically relevant to that application program; and
(g) when the information on the textual data item is determined to be semantically relevant to an application program, processing the information on the textual data item through the application program and displaying results to the user.

20. The method of claim 19, wherein the information on each textual data item comprises a type:value pair associated with the textual data item in the one or more databases.

\* \* \* \* \*